(12) United States Patent
Kawata

(10) Patent No.: US 6,191,504 B1
(45) Date of Patent: Feb. 20, 2001

(54) SYSTEM AND METHOD FOR REDUCED STANDBY POWER CONSUMPTION IN A DISPLAY DEVICE

(75) Inventor: Toshiro Kawata, San Diego, CA (US)

(73) Assignees: Sony Corporation of Japan, Tokyo (JP); Sony Electronics, Inc., Park Ridge, NJ (US)

( * ) Notice: Under 35 U.S.C. 154(b), the term of this patent shall be extended for 0 days.

(21) Appl. No.: 09/401,045

(22) Filed: Sep. 22, 1999

(51) Int. Cl.$^7$ .................................................. H01H 47/00
(52) U.S. Cl. .......................... 307/125; 307/116; 307/139; 307/140
(58) Field of Search ............................... 307/66, 116, 125, 307/139, 140; 345/212; 363/189; 713/310, 324

(56) References Cited

U.S. PATENT DOCUMENTS

| | | | |
|---|---|---|---|
| 5,726,871 | * 3/1998 | Choi | 363/89 |
| 5,745,105 | * 4/1998 | Kim | 345/212 |
| 5,918,060 | * 6/1999 | Jeong | 395/750.06 |
| 5,944,830 | * 8/1999 | Hong et al. | 713/324 |
| 6,006,335 | * 12/1999 | Choi et al. | 713/310 |

* cited by examiner

Primary Examiner—Stephen W. Jackson
Assistant Examiner—Sharon Polk
(74) Attorney, Agent, or Firm—Wagner, Murabito & Hao LLP

(57) ABSTRACT

A system and method for reduced standby power consumption in a display device. In one embodiment, a circuit for power mode switching between a main mode and a standby mode of a display device is provided. In this embodiment, the circuit includes a power supply unit coupled to a power source for receiving an input power signal and for generating output power signals when the display device is in the main mode. The circuit also includes an opto coupler coupled to a computer and responsive to a sync signal therefrom. The opto coupler is also coupled to the power supply unit for selectively sending an OFF signal thereto when the opto coupler does not detect the sync signal from the computer. Moreover, in this embodiment, the power supply unit shuts down and stops generating the output power signals in response to the OFF signal, thereby switching the display device to the standby mode. Thus, in this embodiment, no switching loss is incurred by the power supply unit and the standby power consumption of the circuit is minimized. In one embodiment, the power supply of a display device implemented in accordance with the present invention dissipates less than 1 watt of power during standby mode.

33 Claims, 6 Drawing Sheets

SYSTEM AND METHOD FOR REDUCED STANDBY POWER CONSUMPTION IN A DISPLAY DEVICE

BACKGROUND OF THE INVENTION

1. Field of the Invention

The present invention relates to the design of power supply circuits for electrical and electronic equipment. More specifically, the present invention pertains to the reduction of power consumption in a display device in standby mode.

2. Related Art

With the increasingly widespread use of display devices in businesses, education and the typical household, such as those used in computer systems, much effort is constantly expended in an attempt to reduce the power consumption of display devices so as to conserve energy. Many display devices today provide a mechanism by which the appliance enters a "standby mode" after a period of inactivity. While in the standby mode, the device consumes less power than it does while in active use, commonly referred to in the art as being in its "main mode" under normal operating conditions. When activity resumes, the device exits its standby mode and reenters its main mode, wherein power consumption returns to the normal operating level. As such, power is conserved in standby mode wherein the device remains "on" even though it is not currently being used, and the requisite power level for main mode operation is promptly restored upon the resumption of active use.

Nevertheless, a recent European regulation has stipulated that power consumption of display devices in standby mode is to be less than one watt instead of three watts. This and other similar regulatory changes and the need to conserve power call for the industry to develop new circuits for implementing standby mode in display devices that can meet new power consumption requirements.

To implement power mode switching between main mode and standby mode in a display device as described above, several prior art circuits have been developed to use the synchronization (sync) signal(s), e.g., horizontal sync (h-sync) signal, vertical sync (v-sync) signal, sent from a computer to a display device (e.g., CRT monitor) and lack thereof as a trigger to switch between main mode and standby mode. In the display device art, it is known that with respect to the two sync signals, either separately or as a composite sync signal, when both the h-sync (horizontal) and v-sync (vertical) signals are present, the display device should be in main mode; that when only the v-sync signal is present, the display device should be in suspend mode; and that when only the h-sync signal is present, the display device should be in standby mode. Thus, a sync detect circuit can be used in conjunction with a microprocessor to monitor the sync signal(s) and control the voltage supplied to the monitor accordingly, thereby controlling the power it consumes.

Prior Art FIG. 1 illustrates one prior art circuit 100 wherein two power supplies are used to implement switching between main mode and standby mode. More particularly, prior art circuit 100 has an alternating current (AC) power input 101 and two separate power supplies 110 and 120, wherein AC input 101 is coupled to a main power supply 110 and a standby power supply 120 in parallel. Additionally, a microprocessor 130 is coupled between main power supply 110 and standby power supply 120. Further, a sync detect circuit 140 is coupled between standby power supply 120 and microprocessor 130. Sync detect circuit 140 is also coupled to a computer 199. In this prior art circuit 100, when the display device is operating in main mode, main power supply 110 provides power to the display CRT and other circuit elements (e.g., microprocessor 130 and sync detect circuit 140) via outputs 111, 112, 113 and 114. Typical values for these outputs of main power supply 110 are: +200 volts for output 111, +80 volts for output 112, +16 volts for output 113, and −16 volts for output 114. With these exemplary values, outputs 111 and 112 are typically coupled to the display CRT, and outputs 113 and 114 are typically coupled to the horizontal and vertical differentials (h-diff and v-diff) of the display device. In the same circuit 100, when the display device is in standby mode and the display CRT is inactive, standby power supply 120 provides power to microprocessor 130 via output 123 (e.g., 5 volts or 3.3 volts) and to sync detect circuit 140 via output 124 (e.g., 5 volts or 3.3 volts).

Still referring to Prior Art FIG. 1, sync detect circuit 140 serves as a buffer between computer 199 and microprocessor 130. When sync detect circuit 140 no longer detects a sync signal 194 from computer 199, sync detect circuit 140 sends a "no_sync" signal 143 to microprocessor 130, which in turn sends an "off" signal 131 to main power supply 110. In response to off signal 131, main power supply 110 is turned off and the display device enters standby mode. Note that standby power supply 120 remains on while the display device is in standby mode to power microprocessor 130 and sync detect circuit 140. In other words, standby power supply 120 is always "on" irrespective of whether the display device is in main mode or standby mode. As such, sync detect circuit 140 continues to monitor for sync signal 194 from computer 199 while the display device is in standby mode. Upon detecting the resumption of signal 194 from computer 199, sync detect circuit 140 sends a "sync" signal 143 to microprocessor 130, which in turn sends an "on" signal 131 to main power supply 110. In response, main power supply 110 is turned on again and the display device thus resumes its main mode of operation.

One major disadvantage of prior art circuit 100 of FIG. 1 is that standby power supply 120 remains on even when the display device is in standby mode. The constant presence of an active power supply in circuit 100 means that power loss due to switching action of the power supply (switching loss) cannot be avoided. Consequently, it is difficult to achieve a low power consumption level using prior art circuit 100. For example, with AC input 101 at approximately 230 volts, as it is typically the case for European appliances, and with the exemplary values described above with respect to outputs 123 and 124 (5 volts or 3.3 volts), prior art circuit 100 cannot consistently achieve a standby power consumption of 1 W or less, as is required by the new European standard. Furthermore, prior art circuit 100 is also expensive to implement because an extra power supply, namely, standby power supply 120, is always required in addition to main power supply 110. As such, a circuit for power mode switching in a display device which consistently achieves less than 1 W power dissipation in standby mode and which is inexpensive to build is needed.

FIG. 2 illustrates another prior art circuit 200 wherein a single power supply is used to implement switching between main mode and standby mode. More specifically, prior art circuit 200 has an AC power input 201 and a power supply 210, wherein AC input 201 is coupled to power supply 210 having four outputs 211, 212, 213 and 214. Typical values for these outputs of power supply 210 while the display device is in main mode are: +200 volts for output 211, +80 volts for output 212, +16 volts for output 213, and −16 volts for output 214. Moreover, outputs 211 and 212 are typically coupled to the display CRT, and outputs 213 and 214 are typically coupled to the horizontal and vertical differentials (h-diff and v-diff) of the display device. Also, output 211 is coupled to a voltage drop circuit 250, and output 213 is coupled to a voltage regulator 260. Voltage regulator 260 is coupled to a microprocessor 230 via line 263, and to a sync detect circuit 240 via line 264. Thus, voltage regulator 260 is coupled between power supply 210 and microprocessor 230, as well as between power supply 210 and sync detect circuit 240. Sync detect circuit 240 is further coupled to microprocessor 230 and to a computer 299. Furthermore, microprocessor 230 is coupled to voltage drop circuit 250, which is in turn coupled to voltage regulator 260.

Referring to both Prior Art FIGS. 1 and 2, it is noted that prior art circuit 200 differs from prior art circuit 100 in that a single power supply, namely, power supply 210, provides power to the display CRT and other circuit elements (e.g., microprocessor 230 and sync detect circuit 240) irrespective of whether the display device is operating in main mode or standby mode. In other words, there is no separate power supply for powering the microprocessor 230 and sync detect circuit 240, as is the case in prior art circuit 100 with respect to microprocessor 130 and sync detect circuit 140. In particular, in prior art circuit 200, power is provided to microprocessor 230 and sync detect circuit 240 through voltage regulator 260.

Referring still to Prior Art FIG. 2, sync detect circuit 240 serves as a buffer between computer 299 and microprocessor 230. While the display device is operating in main mode, voltage drop circuit 250 is off and voltage regulator 260 is powered by output 213 of power supply 210 at about +16 volts. When sync detect circuit 240 ceases to detect a sync signal 294 from computer 299, sync detect circuit 240 sends a "no_sync" signal 243 to microprocessor 230, which in turn sends an "on" signal 235 to voltage drop circuit 250. In response, voltage drop circuit 250 is turned on. As a result, the voltage at output 211 of power supply 210 drops from about +200 volts to about +12 volts, whereas the voltage at output 213 of power supply 210 drops from about +16 volts to substantially 0 volt. At this time, the display device enters standby mode, wherein power supply 220 remains on but delivers reduced outputs due to the action of voltage drop circuit 250. In standby mode, voltage regulator 260 no longer derives power via output 213 but instead via voltage drop circuit 250 over line 256. As such, voltage regulator 260 continues to furnish power to microprocessor 230 and to sync detect circuit 249, which continues to monitor for sync signal 294 from computer 299 while the display device is in standby mode. Upon detecting the resumption of signal 294 from computer 299, sync detect circuit 240 sends a "sync" signal 243 to microprocessor 230, which in turn sends an "off" signal 235 to voltage drop circuit 250. In response, voltage drop circuit 250 is turned off again and the display device thus resumes its main mode of operation.

Like prior art circuit 100, one major disadvantage of prior art circuit 200 of FIG. 2 is that the constant presence of an active power supply in circuit 200, namely, power supply 210, means that power loss due to switching action of the power supply (switching loss) cannot be avoided. Consequently, it is difficult to achieve a low power consumption level using prior art circuit 200. For instance, with AC input 201 at approximately 230 volts, as it is typically the case for European appliances, and with the exemplary voltage of +12 volts delivered at output 211, prior art circuit 200 cannot consistently achieve a standby power consumption of 1 W or less, as is required by the new European standard. Furthermore, prior art circuit 200 is still relatively expensive to build because voltage drop circuit 250 and voltage regulator 260 are required for its implementation. As such, a circuit for power mode switching in a display device which consistently achieves less than 1 W power dissipation in standby mode and which is inexpensive to build is needed.

SUMMARY OF THE INVENTION

Additionally, in implementing a viable circuit for power mode switching in a display device, it is highly desirable that components that are well known in the art and are compatible with existing computer systems and/or display devices be used so that the cost of realizing the circuit for power mode switching is low. By so doing, the need to incur costly expenditures for retrofitting existing computer systems and/or display devices or for building custom components is advantageously eliminated.

Thus, a need exists for a system and method for power mode switching in a display device which consistently achieves less than 1 W power dissipation in standby mode. A further need exists for a system and method for power mode switching in a display device which meets the above listed need and which is inexpensive to build. Still another need exists for a system and method for power mode switching in a display device which meets both of the above listed needs and which is conducive to use with existing computer systems and/or display devices.

Accordingly, the present invention provides a system and method for power mode switching in a display device which consistently achieves less than 1 W power dissipation in standby mode. The present invention further provides a system and method for power mode switching in a display device which not only consistently achieves less than 1 W power dissipation in standby mode but which is also inexpensive to build. Moreover, embodiments of the present invention utilize components that are well known in the art and are compatible with existing computer systems and/or display devices, so that the present invention is conducive to use with existing computer systems and/or display devices. These and other advantages of the present invention not specifically mentioned above will become clear within discussions of the present invention presented herein.

More specifically, embodiments of the present invention include a system and method for reduced standby power consumption in a display device. In one embodiment, a circuit for power mode switching between a main mode and a standby mode of a display device is provided. In this embodiment, the circuit includes a power supply unit coupled to a power source for receiving an input power signal and for generating output power signals when the display device is in the main mode. The circuit also comprises an opto coupler coupled to a computer and responsive to a sync signal therefrom. By using the opto coupler to monitor a sync signal from the computer and to control the power supply via feedback signal, the present invention avoids incurring switching loss by the power supply unit and also avoids providing power to microprocessor during standby mode. The standby power consumption of the circuit is thus minimized, since the power supply and microprocessor need not stay on while the display device is in standby mode. The opto coupler is also coupled to the power supply unit for selectively sending an OFF signal thereto when the opto coupler does not detect the sync signal from the computer. In accordance with the present invention, sync signal can be an h-sync signal, a composite sync signal, or any of their equivalents. Moreover, in this embodiment, the power supply unit shuts down and stops generating the output power signals in response to the OFF signal, thereby switching the display device to the standby mode. Thus, in this embodiment, no switching loss is incurred by the power supply unit and the standby power consumption of the circuit is minimized. In a specific embodiment, the present invention includes the above and wherein the input power signal is substantially a 230 volts alternating current (AC) and the circuit consumes power at a rate of less than 1 watt while the display device is in the standby mode.

The invention offers a significant improvement in power conservation over the prior art circuits 100 and 200 as depicted in FIGS. 1 and 2 and as described above, which cannot consistently achieve a 1 watt or lower standby power consumption even though those prior art circuits 100 and 200 typically use more circuit components.

Embodiments of the present invention include the above and wherein the opto coupler is also for selectively sending an ON signal to the power supply unit when the opto coupler detects the sync signal from the computer while the display device is in the standby mode. Additionally, embodiments of the present invention include the above and wherein the power supply unit powers up and resumes generating the output power signals in response to the ON signal, thereby switching the display device to the main mode.

BRIEF DESCRIPTION OF THE DRAWINGS

Prior Art

Prior Art

DETAILED DESCRIPTION OF THE INVENTION

In the following detailed description of the present invention, a system and method for reduced standby power consumption in a display device, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Figure 3A:
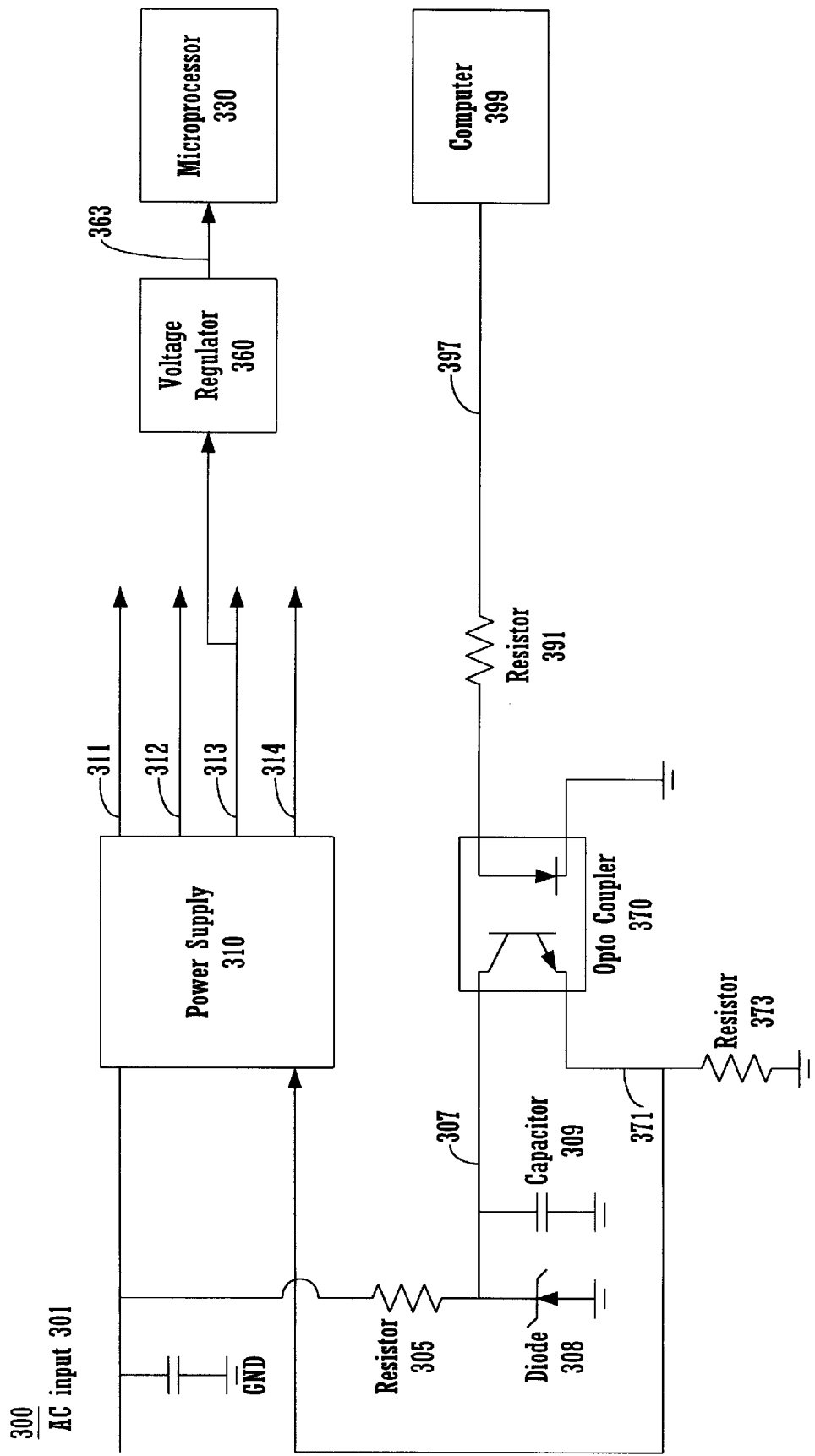
FIG. 3A illustrates an embodiment of a circuit in accordance with the present invention, wherein an opto-coupler is used in conjunction with a single power supply to implement switching between main mode and standby mode without incurring power supply switching loss.

FIG. 3A illustrates one embodiment of a circuit 300 in accordance with the present invention, wherein an opto-coupler is used in conjunction with a single power supply to implement switching between main mode and standby mode without incurring power supply switching loss. In circuit 300, an AC input 301 is coupled to a power supply 310, which has four outputs 311, 312, 313 and 314. Although a number of different voltages can be supported, in one implementation, typical values for these outputs of power supply 310 while the display device is in main mode are: +200 volts for output 311, +80 volts for output 312, +16 volts for output 313, and −16 volts for output 314. Moreover, outputs 311 and 312 are typically coupled to the display CRT, and outputs 313 and 314 are typically coupled to the horizontal and vertical differentials (h-diff and v-diff) of the display device. Output 313 is also coupled to a voltage regulator 360, which is in turn coupled to a microprocessor 330 via line 363. Thus, voltage regulator 360 is coupled between power supply 310 and microprocessor 330.

Still referring to FIG. 3A, an opto coupler 370 is coupled to detect a sync signal 397 from a computer 399, while power supply 310 is coupled to receive a feedback signal 371 from opto coupler 370. Opto coupler 370 comprises a lightemitting diode (LED) and a phototransistor mounted in close proximity to each other in an opaque package. When current flows through the LED in the forward direction, the LED lights up, thus causing the phototransistor to conduct. In one embodiment of the present invention, the anode (e.g., positive terminal) of the LED of opto coupler 370 is coupled to computer 399 to detect sync signal 397, and the cathode (e.g., negative terminal) of the LED of opto coupler 370 is coupled to ground. A resistor 391 having an exemplary resistance of substantially between 1.5 and 2.2 kilo-ohms is optionally coupled between computer 399 and the anode of the LED of opto coupler 370.

With reference still to FIG. 3A, in one embodiment, in circuit 300, the collector terminal of the transistor of opto coupler 370 is coupled to AC input 301 via a resistor 305, which has an exemplary resistance of substantially 100 kilo-ohms, over line 307. Moreover, in this embodiment, a zener diode 308 having an exemplary voltage rating between 5 and 6 volts is coupled between resistor 305 and ground. A capacitor 309 having an exemplary capacitance of substantially between 10 and 22 microfarads is also optionally coupled in parallel to zener diode 308. Furthermore, in this embodiment, the emitter terminal of the transistor of opto coupler 370 is coupled to power supply 310. The emitter terminal of the transistor of opto coupler 370 is also coupled to ground via a resistor 373 having an exemplary resistance of substantially 470 kilo-ohms.

Figure 3B:
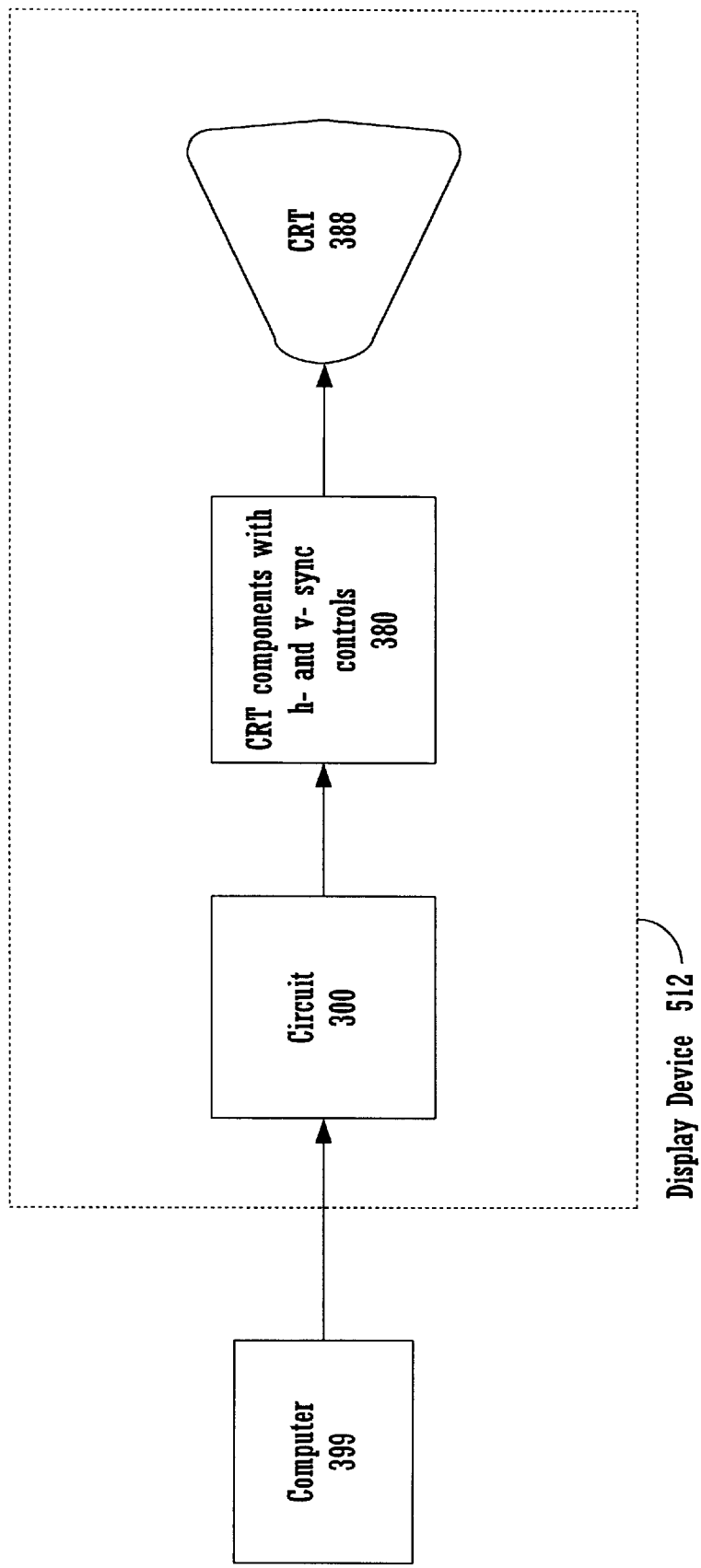
FIG. 3B is a block diagram illustrating an exemplary implementation of a cathode ray tube (CRT) display device using a circuit in accordance with one embodiment of the present invention.

Referring next to FIG. 3B, a block diagram illustrating an exemplary implementation of a cathode ray tube (CRT) display device using a circuit in. accordance with one embodiment of the present invention is shown. In this exemplary implementation, computer 399 is coupled to a display device 512. Display device 512 comprises circuit 300 of FIG. 3A coupled to a CRT component block 380, which is in turn coupled to a CRT 388. Circuit 300 performs power mode switching between main mode and standby mode. CRT component block 380 includes h- and v-sync controls for receiving sync signal(s) from computer 399 and for controlling CRT 388, which serves as a raster display.

Figure 4:
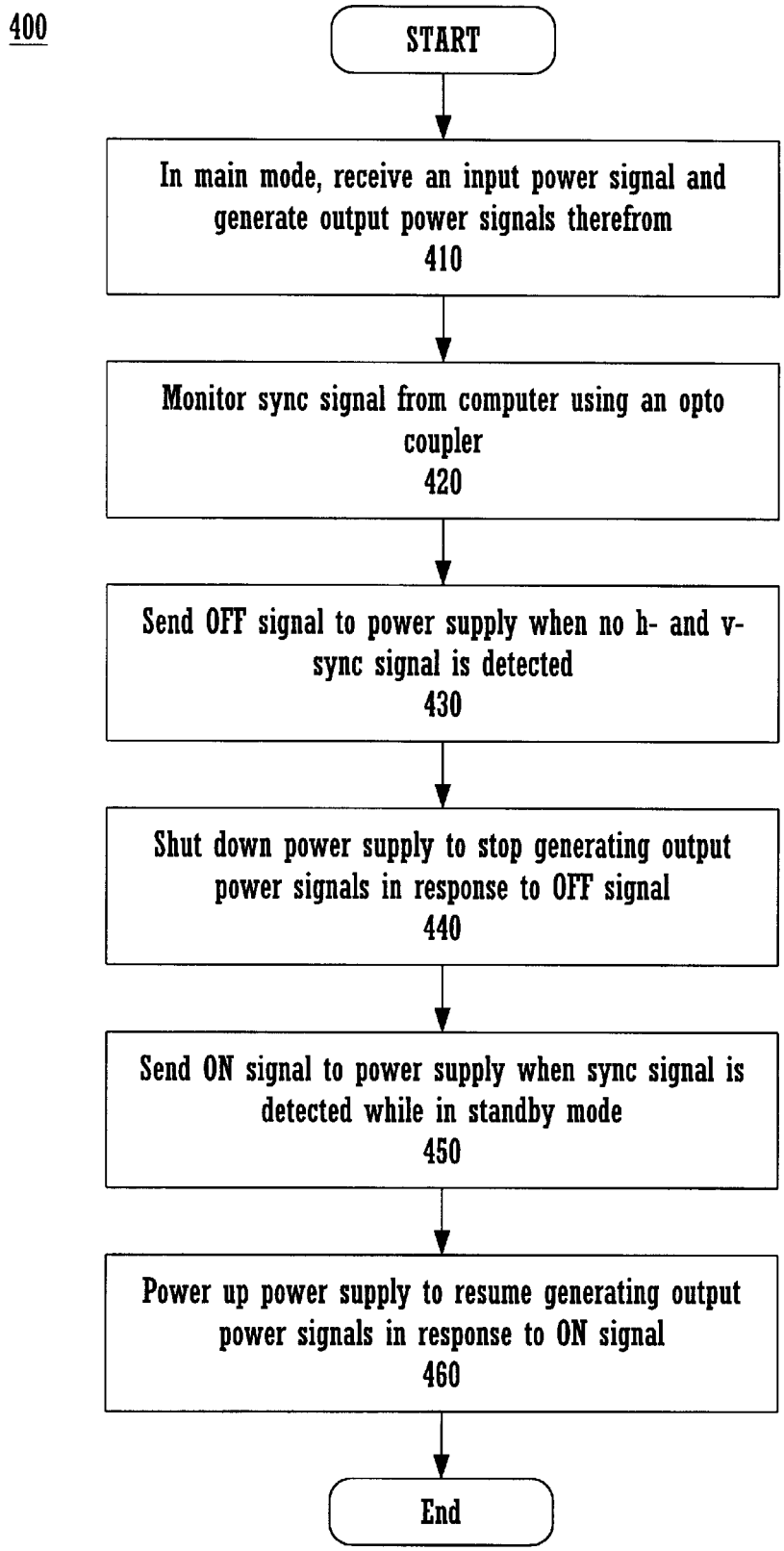
FIG. 4 is a flow diagram illustrating steps for performing switching between main mode and standby mode without incurring power supply switching loss using circuit 300 of FIG. 3.

Referring next to FIG. 4, a flow diagram 400 illustrating steps for performing switching between main mode and standby mode without incurring power supply switching loss using circuit 300 of FIG. 3A is shown. In step 410, while the display device is operating in main mode, power supply 310 receives AC input 301 and generates voltage supply outputs 311, 312,313 and 314 therefrom. Moreover, in this embodiment, a collector voltage is applied to the transistor of opto coupler 370 by AC input 301 via line 307 so that the transistor of opto coupler 370 is in its active region.

In step 420, opto coupler 370 monitors sync signal 397 from computer 399. More specifically, in this embodiment, the LED of opto coupler 370 is coupled to computer 399 via resistor 391 so that the LED is selectively turned on and off based on whether sync signal 397 is detected from computer 399. When opto coupler 370 detects sync signal 397 from computer 399, the LED of opto coupler 370 lights up and causes the transistor of opto coupler 370 to conduct. On the other hand, when opto coupler 370 ceases to detect sync signal 397 from computer 399, the LED of opto coupler 370 turns off, so that the transistor of opto coupler 370 no longer conducts.

Referring again to FIG. 4, in step 430, opto coupler 370 sends an "OFF" signal to power supply 310 when sync signal 397 is not detected for a predetermined time period, whereas in step 440, power supply 310 is shut down and stops generating outputs 311, 312, 313 and 314 in response to the "OFF" signal. More specifically, in this embodiment, while the display device is operating in main mode and opto coupler 370 stops receiving sync signal 397 from computer 399, the LED of opto coupler 370 turns off, so that the transistor of opto coupler 370 no longer conducts. Therefore, feedback signal 371 is set to 'low'0 and becomes an "OFF" signal to power supply 310. At this time, power supply 310 is turned off and the display device enters standby mode, wherein outputs 311, 312, 313 and 314 of power supply 310 stop delivering power to circuit elements coupled thereto. In particular, voltage regulator 360 no longer derives power from output 313 and microprocessor 330 is also powered off as a result.

With reference still to FIG. 4, in step 450, while the display device is operating in standby mode, opto coupler 370 sends an "ON" signal to power supply 310 when sync signal 397 is detected. Responsive thereto, in step 460, power supply 310 is powered up and resumes generating outputs 311, 312, 313 and 314 in response to the "ON" signal. More specifically, in this embodiment, while the display device is operating in standby mode and opto coupler 370 detects sync signal 397 from computer 399, the LED of opto coupler 370 lights up and causes the transistor of opto coupler 370 to conduct. This sets feedback signal 371 to 'high', which acts as an "ON" signal for activating power supply 310. Power supply 310 is turned on once again and the display device enters main mode, wherein outputs 311, 312, 313 and 314 of power supply 310 resumes delivering power to circuit elements coupled thereto. Method steps for performing power mode switching using circuit 300 of FIG. 3 are thus described.

Figure 5:
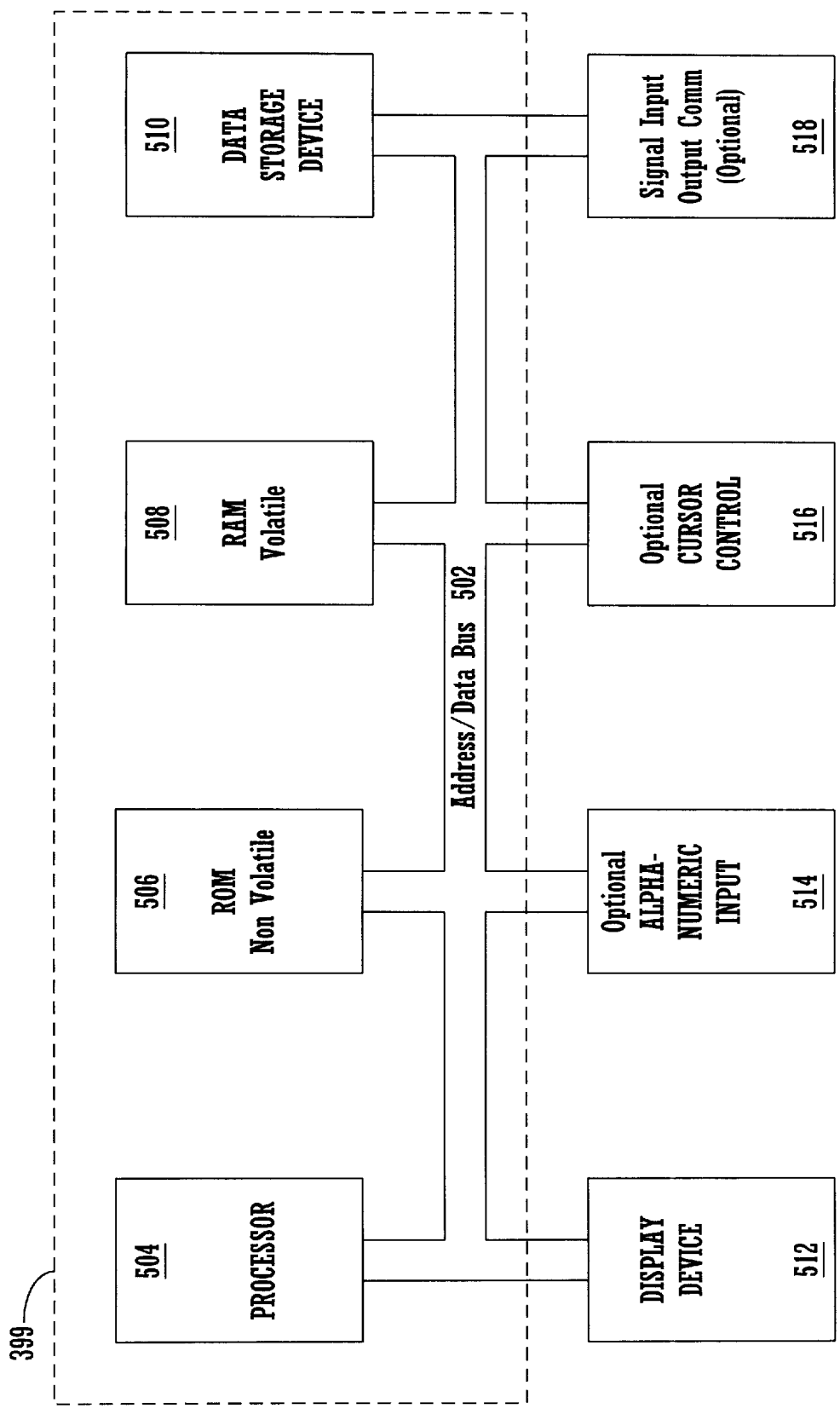
FIG. 5 is an exemplary general purpose computer system with which embodiments of the present invention can be implemented.

Although a variety of different computer systems can be used with the present invention, an exemplary general purpose computer system 399 is shown in FIG. 5. In general, computer system 399 includes an address/data bus 502 for communicating information, a central processor 504 coupled with bus 502 for processing information and instructions, a non-volatile memory 506 (e.g., read only memory ROM) coupled with bus 502 for storing static information and instructions for processor 504 and a volatile memory 508 (e.g., random access memory RAM) coupled with bus 502 for storing information and instructions for central processor 504. Computer system 399 also includes a data storage device 510 ("disk subsystem") such as a magnetic or optical disk and disk drive coupled with bus 502 for storing information and instructions. Data storage device 510 can include one or more removable magnetic or optical storage media (e.g., diskettes, tapes) which are computer readable memories. Memory units of system 399 include 506, 508 and 510. A display device 512 is also coupled to bus 502 for displaying information to the computer user. Display device 512 may be a liquid crystal device, other flat panel display, cathode ray tube, or other display device suitable for creating graphic images and alphanumeric characters recognizable to the user. In particular, in accordance with the present invention, display device 512 is capable of switching between a main mode and a standby mode.

Also included in computer system 399 of FIG. 5 is an optional alphanumeric input device 514 including alphanumeric and function keys coupled to bus 502 for communicating information and command selections to central processor 504. Computer system 399 also includes an optional cursor control or directing device 516 coupled to bus 502 for communicating user input information and command selections to central processor 504. Cursor control device 516 allows the computer user to dynamically signal the two dimensional movement of a visible symbol (cursor) on a display screen of display device 512. Many implementations of cursor control device 516 are known in the art including a trackball, mouse, touch pad, joystick or special keys on alphanumeric input device 514 capable of signaling movement of a given direction or manner of displacement. Alternatively, it will be appreciated that a cursor can be directed and/or activated via input from alphanumeric input device 514 using special keys and key sequence commands. The present invention is also well suited to directing a cursor by other means such as, for example, voice commands. Computer system 399 can also include an optional signal input output communication device 512 (e.g., modem, network interface card NIC) coupled to bus 502 for interfacing with other computer systems.

It is appreciated that computer system 399 described herein illustrates an exemplary configuration of a general purpose computer system with which embodiments of the present invention can be implemented. Nevertheless, other computer systems with differing configurations can also be used in place of computer system 399 within the scope of the present invention.

Importantly, referring back to FIG. 3A, in circuit 300, in stark contrast to the operation of prior art circuits 100 and 200 described above, power supply 310 of the present invention does not need to remain "on" while the display device is in standby mode. This is because, in accordance with the present invention, microprocessor 330 need not respond to sync signal 397 and turn power supply 310 on or off correspondingly when a change of power mode occurs. Therefore, no power needs to be supplied from power supply 310 (or from any other power source) to microprocessor 330 while the display device is in standby mode. Instead, in accordance with the present invention, opto coupler 370 directly monitors sync signal 397 from computer 399 and controls power supply 310 accordingly, independently of microprocessor 330 and irrespective of whether the display device is in main mode or standby mode. Thus, if the display device is operating in standby mode when sync signal 397 from computer 299 resumes, the LED of opto coupler 370 lights up again and the transistor of opto coupler 370 conducts again. As such, feedback signal 371 is set to 'high' thereby turning on power supply 310. The display device thus resumes its main mode of operation.

Figure 1:
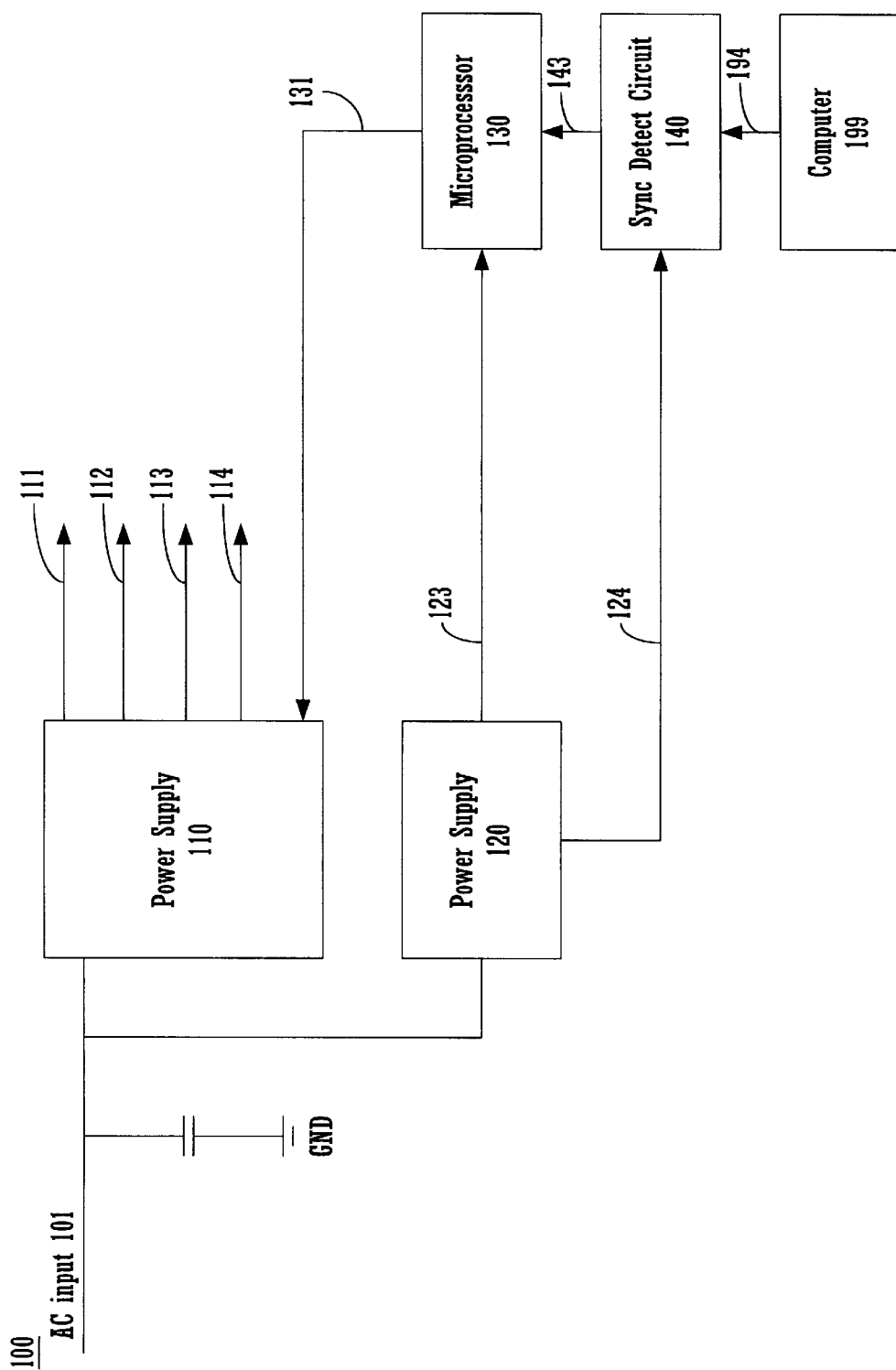
FIG. 1 illustrates a prior art circuit wherein two power supplies are used to implement switching between main mode and standby mode.
Figure 2:
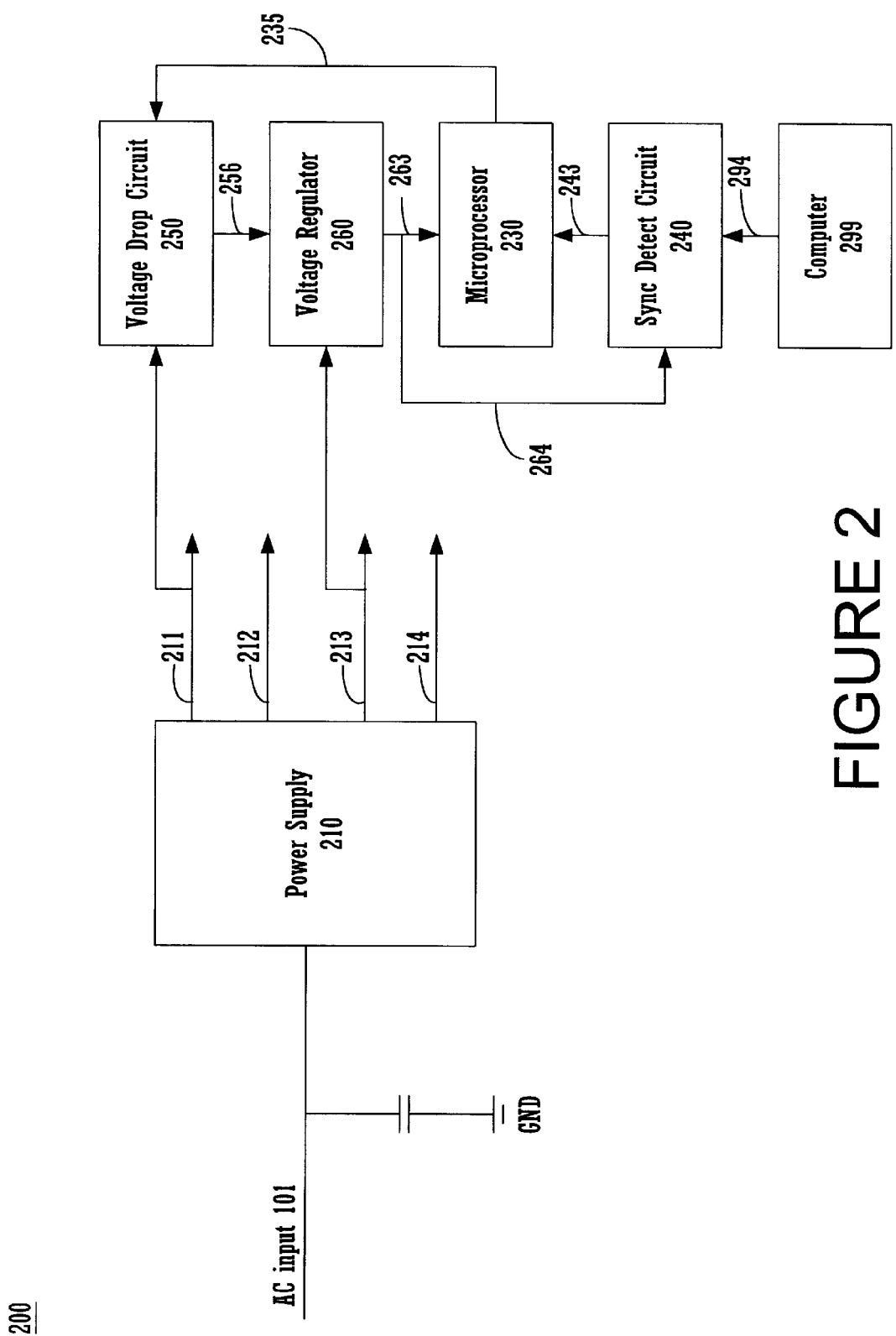
FIG. 2 illustrates another prior art circuit wherein a single power supply is used to implement switching between main mode and standby mode.

It is appreciated that by using opto coupler 370 to monitor sync signal 397 from computer 399 and to control power supply 310 via feedback signal 371, the present invention advantageously avoids incurring switching loss by the power supply unit and also avoids providing power to microprocessor 330 during standby mode. The standby power consumption of the circuit is thus minimized, since power supply 310 and microprocessor 330 need not stay on while the display device is in standby mode. As an example, with AC input 301 at approximately 230 volts, as it is typically the case for European appliances, circuit 300 in accordance with the present invention consistently achieves a standby power consumption of substantially 0.4 watt, which is not only in full compliance with the new European standard (1 watt or lower) but also provides a generous margin of additional energy saving. This is also a significant improvement in power conservation over the prior art circuits 100 and 200 as depicted in FIGS. 1 and 2 and as described above, which cannot consistently achieve a 1 watt or lower standby power consumption even though those prior art circuits 100 and 200 typically use more circuit components.

Furthermore, circuit 300 in accordance with embodiments of the present invention is inexpensive to build because the circuit elements required for its implementation, including opto coupler 370, zener diode 308, resistors 305, 373 and 391 and capacitor 309, are commonly available and are inexpensive. As such, a system and method for power mode switching in a display device which consistently achieves less than 1 W power dissipation in standby mode and which is inexpensive to build is furnished by the present invention.

Moreover, it is appreciated that circuit 300 in accordance with embodiments of the present invention does not require specialized circuit components or extensive retrofitting of existing computer systems and/or display devices, because the circuit elements required for its implementation are commonly used in today's electronic appliances and are fully compatible with existing computer systems and/or display devices. As such, a system and method for power mode switching in a display device with reduced standby power dissipation, which is inexpensive to build, and which is conducive to use with existing computer systems and/or display devices is provided by the present invention.

It is further appreciated that in accordance with the present invention, sync signal 397 can be an h-sync signal, a composite sync signal, or any of their equivalents. Moreover, although exemplary values for various circuit elements are given with respect to embodiments of the present invention described above, such values are illustrative only and can vary within the scope and spirit of the present invention.

The preferred embodiment of the present invention, a method and system for allowing a power supply circuit to use a small current specification switch, is thus described. While the present invention has been described in particular embodiments, it should be appreciated that the present invention should not be construed as limited by such embodiments, but rather construed according to the below claims.

What is claimed is:

1. A circuit for switching between a main power mode and a standby power mode of a display device, said circuit comprising:
   a power supply unit configured to receive an input power signal from a power source and for generating output power signals when said display device is in said main power mode;
   an opto coupler responsive to a sync signal from a computer, wherein said opto coupler is also coupled to said power supply unit and configured to selectively send an OFF signal thereto when said opto coupler does not detect said sync signal from said computer for a predetermined time period;
   wherein said power supply unit switches said display device to said standby power mode to stop generating said output power signals in response to said OFF signal; and
   a microprocessor coupled to receive one of said output power signals from said power supply unit configured to control said display device, wherein said microprocessor is powered off while said display device is in said standby power mode.

2. The circuit as recited in claim 1 wherein said opto coupler is also configured to selectively send an ON signal to said power supply unit when said opto coupler detects said sync signal from said computer while said display device is in said standby power mode.

3. The circuit as recited in claim 2 wherein said power supply unit powers up to resume generating said output power signals in response to said ON signal to switch said display device to said main power mode.

4. The circuit as recited in claim 1 wherein said input power signal is substantially a 230 volts alternating current (AC) signal and wherein said circuit consumes power at a rate of less than 1 watt while said display device is in said standby power mode.

5. The circuit as recited in claim 1 further comprising a voltage regulator coupled between said power supply unit and said microprocessor.

6. The circuit as recited in claim 1 further comprising:
   a zener diode coupled between a collector terminal of a phototransistor of said opto coupler and ground; and
   a first resistor coupled between said zener diode and said power source.

7. The circuit as recited in claim 6 further comprising a capacitor coupled in parallel to said zener diode.

8. The circuit as recited in claim 6 further comprising a second resistor coupled between an emitter terminal of said phototransistor of said opto coupler and ground.

9. The circuit as recited in claim 6 further comprising a third resistor coupled between an anode of a light emitting diode (LED) of said opto coupler and said computer.

10. A method for power mode switching between a main mode and a standby mode of a display device, said method comprising the steps of:
    a) receiving an input power signal from a power source and generating output power signals therefrom using a power supply unit when said display device is in said main mode;
    b) monitoring a sync signal originating from a computer using an opto coupler;
    c) selectively sending an OFF signal from said opto coupler to said power supply unit when said opto coupler does not detect said sync signal from said computer for a predetermined time period;
    d) shutting down said power supply unit to stop generating said output power signals in response to said OFF signal to switch said display device to said standby mode;
    e) receiving one of said output power signals from said power supply unit using a microprocessor for controlling said display device; and
    f) powering off said microprocessor upon said display device entering said standby mode.

11. The method as recited in claim 10 further comprising the step of selectively sending an ON signal to said power supply unit when said opto coupler detects said sync signal from said computer while said display device is in said standby mode.

12. The method as recited in claim 11 further comprising the step of powering up said power supply unit to resume generating said output power signals in response to said ON signal to switch said display device to said main mode.

13. The method as recited in claim 10 wherein said input power signal is substantially a 230 volts alternating current (AC) signal and wherein said circuit consumes power at a rate of less than 1 watt while said display device is in said standby mode.

14. The method as recited in claim 10 further comprising the step of regulating voltage supplied to said microprocessor using a voltage regulator.

15. A circuit for power mode switching between a main mode and a standby mode of a display device, said circuit comprising:
   a power supply means for receiving an alternating current (AC) input power signal from a power source and for generating direct current (DC) output power signals when said display device is in said main mode;
   an opto coupler means responsive to a sync signal from a computer, wherein said opto coupler mean is also coupled to said power supply means for selectively sending an OFF signal thereto when said opto coupler means does not detect said sync signal from said computer for a predetermined time period while said display device is in said main mode and also for selectively sending an ON signal thereto when said opto coupler detects said sync signal from said computer while said display device is in said standby mode;
   a microprocessor means coupled to receive one of said DC output power signals from said power supply means and for controlling said display device, wherein said microprocessor means is powered off while said display device is in said standby mode; and
   wherein said power supply means shuts down and stops generating said DC output power signals in response to said OFF signal to switch said display device to said standby mode.

16. The circuit as recited in claim 15 wherein said power supply means powers up and resumes generating said DC output power signals in response to said ON signal to switch said display device to said main mode, and wherein said circuit consumes power at a rate of less than 1 watt while said display device is in said standby mode.

17. The circuit as recited in claim 15 further comprising a voltage regulator coupled between said power supply means and said microprocessor means.

18. The circuit as recited in claim 15 further comprising:
   a zener diode coupled between a collector terminal of a phototransistor of said opto coupler means and ground;
   a resistor coupled between said zener diode and said power source; and
   a capacitor coupled in parallel to said zener diode.

19. A circuit for switching between a main power mode and a standby power mode of a display device, said circuit comprising:
   a power supply unit configured to receive an input power signal from a power source and for generating output power signals when said display device is in said main power mode;
   an opto coupler responsive to a sync signal from a computer, wherein said opto coupler is also coupled to said power supply unit and configured to selectively send an OFF signal thereto when said opto coupler does not detect said sync signal from said computer for a predetermined time period;
   wherein said power supply unit switches said display device to said standby power mode to stop generating said output power signals in response to said OFF signal;
   a zener diode coupled between a collector terminal of a phototransistor of said opto coupler and ground; and
   a first resistor coupled between said zener diode and said power source.

20. The circuit as recited in claim 19 further comprising a capacitor coupled in parallel to said zener diode.

21. The circuit as recited in claim 19 further comprising a second resistor coupled between an emitter terminal of said phototransistor of said opto coupler and ground.

22. The circuit as recited in claim 19 further comprising a third resistor coupled between an anode of a light emitting diode (LED) of said opto coupler and said computer.

23. A circuit for switching between a main power mode and a standby power mode of a display device, said circuit comprising:
   a power supply unit configured to receive an input power signal from a power source and for generating output power signals when said display device is in said main power mode;
   an opto coupler responsive to a sync signal from a computer, wherein said opto coupler is also coupled to said power supply unit and configured to selectively send an OFF signal thereto when said opto coupler does not detect said sync signal from said computer for a predetermined time period;
   wherein said power supply unit switches said display device to said standby power mode to stop generating said output power signals in response to said OFF signal, wherein said input power signal is substantially a 230 volts alternating current (AC) signal and wherein said circuit consumes power at a rate of less than 1 watt while said display device is in said standby power mode.

24. A method for power mode switching between a main mode and a standby mode of a display device, said method comprising the steps of:
   a) receiving an input power signal from a power source and generating output power signals therefrom using a power supply unit when said display device is in said main mode;
   b) monitoring a sync signal originating from a computer using an opto coupler;
   c) selectively sending an OFF signal from said opto coupler to said power supply unit when said opto coupler does not detect said sync signal from said computer for a predetermined time period; and
   d) shutting down said power supply unit to stop generating said output power signals in response to said OFF signal to switch said display device to said standby mode and wherein said input power signal is substantially a 230 volts alternating current (AC) signal and wherein said circuit consumes power at a rate of less than 1 watt while said display device is in said standby mode.

25. A circuit for switching between a main power mode and a standby power mode of a display device, said circuit comprising:
   a power supply unit configured to receive an input power signal from a power source and for generating output power signals when said display device is in said main power mode;

an opto coupler responsive to a sync signal from a computer, wherein said opto coupler is also coupled to said power supply unit and configured to selectively send an OFF signal thereto when said opto coupler does not detect said sync signal from said computer;

wherein said power supply unit switches said display device to said standby power mode to stop generating said output power signals in response to said OFF signal; and a microprocessor coupled to receive one of said output power signals from said power supply unit configured to control said display device, wherein said microprocessor is powered off while said display device is in said standby power mode.

26. The circuit as recited in claim 25 wherein said opto coupler is also configured to selectively send an ON signal to said power supply unit when said opto coupler detects said sync signal from said computer while said display device is in said standby power mode.

27. The circuit as recited in claim 26 wherein said power supply unit powers up to resume generating said output power signals in response to said ON signal to switch said display device to said main power mode.

28. The circuit as recited in claim 25 wherein said input power signal is substantially a 230 volts alternating current (AC) signal and wherein said circuit consumes power at a rate of less than 1 watt while said display device is in said standby power mode.

29. The circuit as recited in claim 25 further comprising a voltage regulator coupled between said power supply unit and said microprocessor.

30. The circuit as recited in claim 25 further comprising:
a zener diode coupled between a collector terminal of a phototransistor of said opto coupler and ground; and
a first resistor coupled between said zener diode and said power source.

31. The circuit as recited in claim 30 further comprising a capacitor coupled in parallel to said zener diode.

32. The circuit as recited in claim 30 further comprising a second resistor coupled between an emitter terminal of said phototransistor of said opto coupler and ground.

33. The circuit as recited in claim 30 further comprising a third resistor coupled between an anode of a light emitting diode (LED) of said opto coupler and said computer.

* * * * *